United States Patent [19]

Geary, Sr.

[11] Patent Number: 4,566,217

[45] Date of Patent: * Jan. 28, 1986

[54] BAIT CASTING DEVICE AND METHOD

[76] Inventor: Nelse Geary, Sr., 18 Cannon Dr., Trenton, N.J. 08690

[*] Notice: The portion of the term of this patent subsequent to May 28, 2001 has been disclaimed.

[21] Appl. No.: 366,044

[22] Filed: Apr. 6, 1982

[51] Int. Cl.⁴ .............................................. A01K 91/02
[52] U.S. Cl. ........................................................ 43/19
[58] Field of Search ............................ 43/19, 4.5, 21.2

[56] References Cited

U.S. PATENT DOCUMENTS

| | | | |
|---|---|---|---|
| 2,381,089 | 8/1945 | Tweit | 43/19 |
| 2,531,418 | 11/1950 | Fitzharris | 43/19 |
| 2,795,884 | 6/1957 | Wright | 43/19 |
| 3,026,644 | 3/1962 | Raider | 43/19 |
| 3,292,296 | 12/1966 | Viveiros | 43/19 |
| 3,494,061 | 2/1970 | Pool | 43/19 |
| 3,641,695 | 2/1972 | Zenick | 43/19 |
| 3,834,056 | 9/1974 | Filippi | 43/19 |
| 4,257,181 | 3/1981 | Cooper | 43/21.2 |

FOREIGN PATENT DOCUMENTS

| | | | |
|---|---|---|---|
| 483261 | 7/1953 | Italy | 43/19 |
| 591455 | 4/1959 | Italy | 43/19 |

*Primary Examiner*—Gene P. Crosby
*Attorney, Agent, or Firm*—William L. Muckelroy

[57] ABSTRACT

A device for casting a weighted fishing line that includes a hollow cylindrical member having threaded thereon at one end a conical augered spike and having on the other end a cap which is held onto the cylindrical member by means of a ridge on the cylindrical member. The cap has a slot which corresponds with a slot in the cylindrical member through which the fishing line is threaded. The casting device is adapted for use with the fishing line attached to a weight of a geometrical shape such that it will not pass through the aperture in the cylindrical member. The augered spike is screwed into the earth, the weighted line is placed into the cylindrical member and the cap placed onto the member such that when pressure is applied to the fishing line this pressure is transferred to the cap on the cylindrical member by means of the weight on the line which is pulled up against the slot in the member to release the cap.

The pressure necessary to free the cap from the cylinder is selected by engaging a selected number of ridges on the cylinder to hold the cap thereon. The fishing line is attached to a fishing rod and the user of the rod applies pressure on the line with the casting device located behind the fisherman. When a pressure equal to the force by which the cap is held onto the cylinder is exerted by the fisherman. The cap is released and the weighted line is propelled into the air over the fisherman's head and into the body of water where fishing is to take place. The combination of the resiliency of the fishing rod, tension in the line and the static pressure built up against the cap operates to improve the distance over which the weight on the fishing line is cast.

10 Claims, 4 Drawing Figures

BAIT CASTING DEVICE AND METHOD

BACKGROUND OF THE INVENTION

1. Field of the Invention

This invention relates to a device and method for casting a fishing line over a great distance to a desired location in a lake, stream, surf or the like. The device has a cylinder which is anchored to the ground by means of a cone shaped spike having auger blades formed around the spike for the purpose of holding the cylinder next to the ground. The device further includes a ridge on the side of the cylinder adapted to interfere and mate with a groove in a cap which fits on top of the cylinder and which holds a line inside the cylinder preferrably with a hook, weight and bait assembly attached to the line. By placing the line, weight and hook inside the cylinder and by holding the line and assembly inside the cylinder by means of the cap, a fisherman with a flexible fishing rod may apply significantly greater amounts of pressure to the weight prior to launching the weight into the desired fishing location and thereby achieve greater casting distances than would otherwise be available.

2. Description of the Prior Art

The conventional way to cast out a fishing line is with a long casting rod of 4 to 8 feet in length with a reel attached to the line. The rod is swung through an arc to build up centrifugal force at the foward tip of the rod at the precise moment the reel is released causing the weighted fishing line to strip off the reel and be cast out through the foward tip of the rod. In the present invention this is modified by holding the weight in the cylinder of the invention until the desired amount of pressure or force is built up against the cap attached to the top of the cylinder. At that precise moment, the weight is released by forcing the cap off of the top of the cylinder. The weight then begins a trajectory over the head of the fisherman and the weight pulls additional fishing line off of the reel as it travels towards its desired location.

Spring loaded devices exist which significantly increase the distance over which a fishing line, hook and weight assembly can be cast by significantly increasing the force exerted to launch the assembly by building up static force or static pressure on the weight, releasing it when a specified and predetermined amount of force has built up on the fishing line.

An object of the present invention is to contain the weight on the fishing line in a chamber which is attached rigidly to the earth by means of a conical spike and to cause the cylinder to open by force exerted on the line which overcomes the resistance used to maintain a cap on the cylinder.

Another object is to provide a force build up significantly greater than that which could otherwise be exerted by simply swinging the line with the force attached.

A further object is to momentarily increase the mass of the fishing weight by the force exerted to retain a cap on a cylinder wherein the weight is held against the cap and then diminishing this force to zero by the cap being removed and the force thereby being transferred to the weight attached to the line and the line being freed to be launched by the flexure of the fishing rod operated by the fisherman.

Usually the method of casting a fishing line closely resembles tossing a lariat rope and as with the rod and reel method requires a great deal of skill in order to launch the fishing line, weight and hook assembly a significant distance into the surf for fishing. A further object of the present invention is to eliminate the skill required to launch the weight and hook over a great distance by permitting greater force to be applied to the weight prior to its launching. Accordingly, persons who have avoided fishing because they did not have the necessary and requisite skill for launching the line, weight and hook assembly the proper distance for surf or other fishing can readily compensate for this by use of the present casting device and its method of operation.

Other objects, uses and advantages of the invention become apparent to those skilled in the art from the following description, the claims and from the drawings in which:

SPECIFICATION

Figure 1:
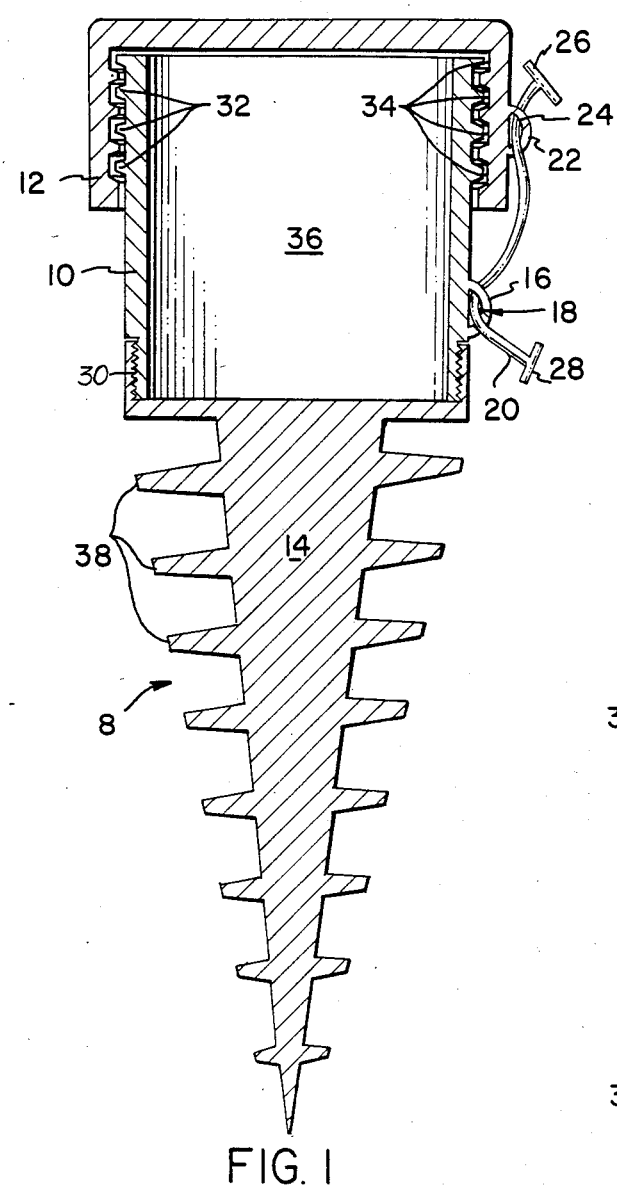
FIG. 1 is a cross section of a first preferred embodiment of the device of the invention.

Referring in detail to these drawings, FIG. 1 shows a cross-section of a casting device 8 made of an enclosure such as cylinder 10, for example, having attached thereto a cover means, for example, a cap 12 for covering a coverable opening of cylinder 10. Cylinder 10 has attached underneath a cone shaped spike 14 and an eyelet 16. Through the aperture 18 of said eyelet 16 is threaded a means 20 which is similarly connected to another eyelet 22 formed onto cap 12. The eyelet 22 has an aperture 24. The attachment means 20 is threaded through the aperture 24 of the eyelet 22.

Preferably, the attachment means 20 is comprised of a flexible plastic material such as Teflon. It is elongated and has short linear members 26 and 28 attached to each end. The attachment means 20 is designed to be easily replaceable and cheap and is similar to a means used to attach tags to clothing. To attach the means 20 to the cylinder 10 one of the linear members 28, for example, is extended through the aperture 18. The other linear members 26, for example, is then flexed and threaded through the aperture 24 and the eyelet 22.

The cylinder 10 has threads 30, for example, at one end thereof for attaching (an attachment) means for attaching said enclosure to earth, for example, a spike 14. The spike 14 is screwed, for example, onto the cylinder 10 by means of threads 30. On the other hand, the other end of the cylinder 10 has disposed about its outside surface at least one ridge 32, means for demountably attaching the cover means to the enclosure whereby said cover means is preferably the cap 12, for example. The cap 10 is removed by the application of a remote force. The means for demountably attaching the cover means to the enclosure may comprise a plurality of ridges 32. These ridges 32 are designed to facilitate the attachment of the cap 12 to the cylinder 10. Cap 12 is adapted for attachment to the cap 10 by having inside thereof a plurality of grooves 34 of a size suitable for each of the ridges 32 to disengageably fit therein. Noteworthy is that the amount of force by which the cap 12 is held onto the cylinder 10 is adjustably determined by the number of ridges 32 engaged by the grooves 34 inside the cap 12. The cylinder 10 is hollow and forms a plenum 36 within which a hook, fishing line and weight assembly (not shown in FIG. 1) may be disposed when the cylinder 10 is in use.

The conical spike 14 is designed to bore into ground such as sandy soil or the like. For this purpose disposed spirally about the spike 14 is an auger blade 38 shown in cross-section in FIG. 1.

Figure 2:
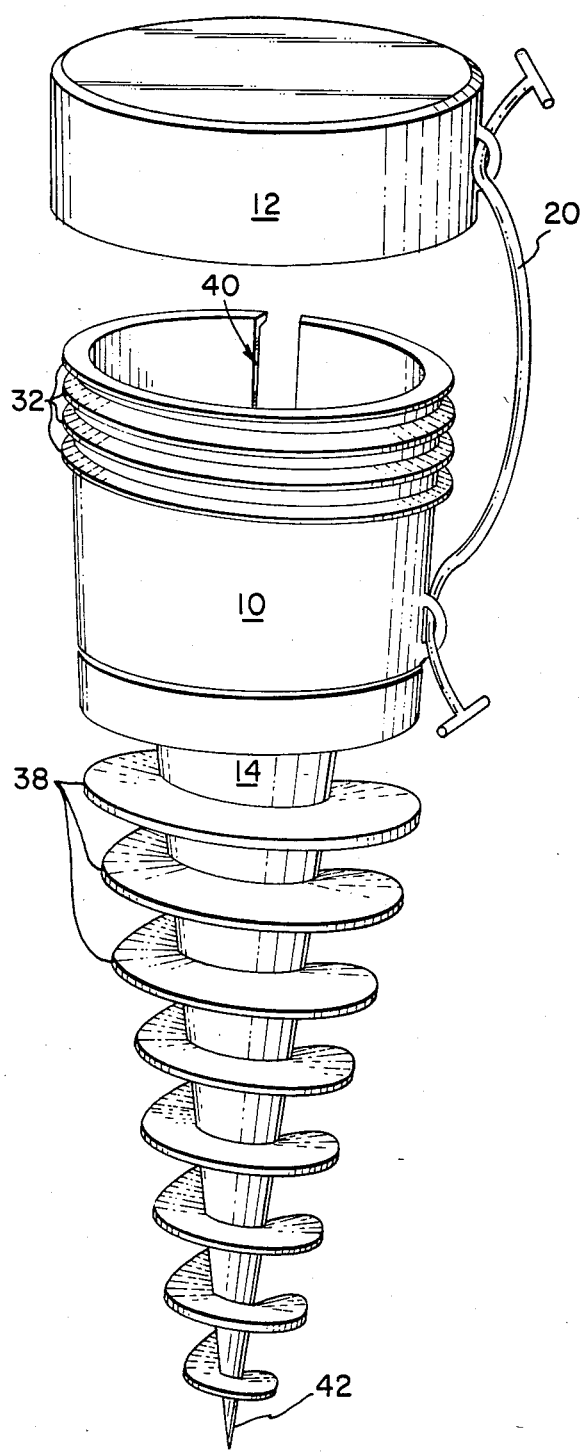
FIG. 2 is a perspective view of the embodiment of FIG. 1 opened.

FIG. 2 is a perspective view of the device 8 of the invention with the cap 12 removed and retained by the attachment means 20. Details of the auger blade 38 of the spike 14 are illustrated. Details of the ridges 32 disposed about the upper end of the cylinder 10 are also illustrated.

Ridges 32 are disposed about the cylinder 10 beginning with a first of the ridges 32 at the lip of the cylinder 10. Ridges 32 are each separately ringed about the cylinder 10.

The blades 38 are disposed in the same fashion as threads and are spiralled about the conically shaped spike 14. Each ridge 32 is interrupted by an aperture, for example slot 40, formed partially down the side of the cylinder 10. The previously referred to remote force is applied through the slot 40 from within the cylinder 10.

The cone shaped spike 14 is mounted in the ground by first inserting the pointed tip 42. The auger blade 38 is then screwed into the ground (not shown) by grasping the cylinder 10 and screwing the cylinder 10 into the ground with a circular motion.

Figure 4:
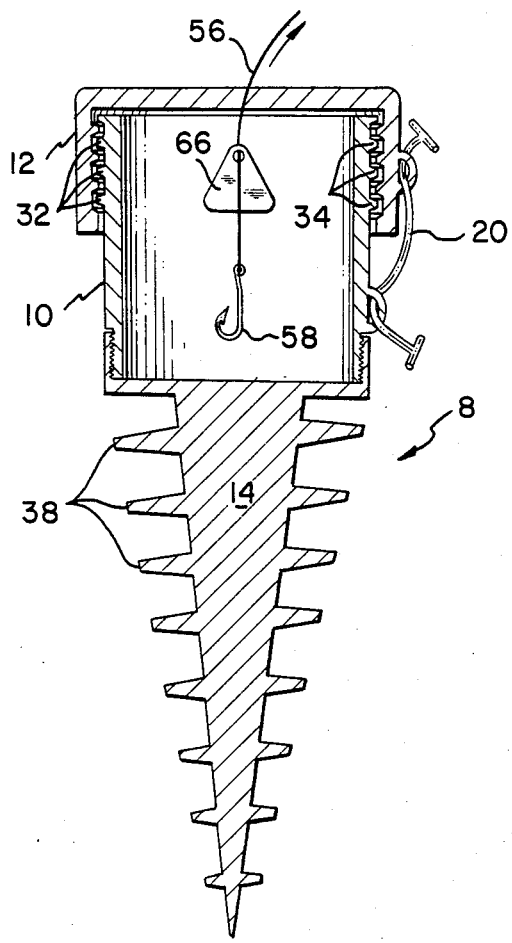
FIG. 4 is a detailed cross section of the device of the invention showing the internal structure of the device and the disposition of the weight, fishing line and the hook within the device when pressure is applied to the line.
Figure 3:
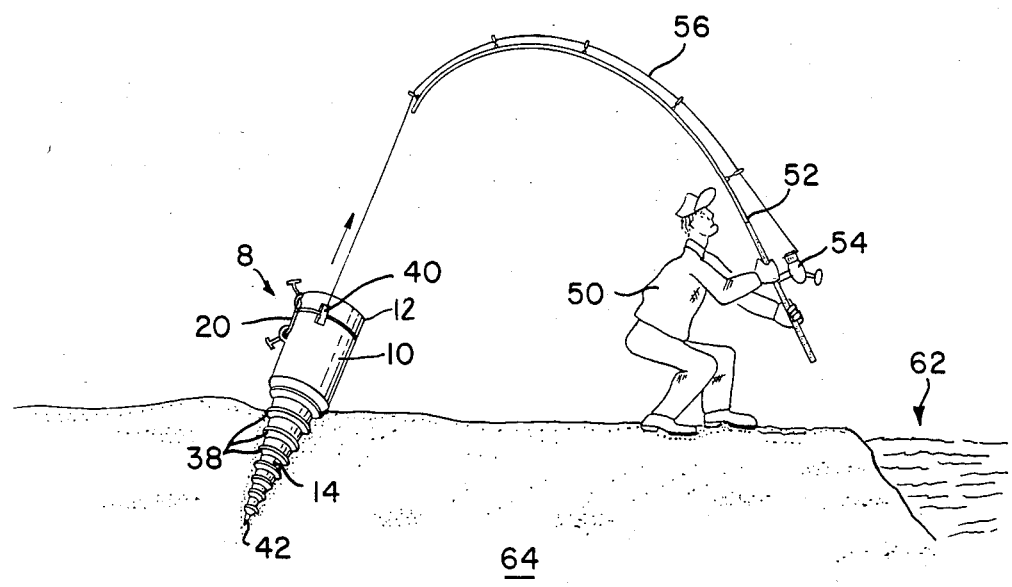
FIG. 3 is a perspective view of the first preferred embodiment of the invention showing the device of the invention in use, the fishing line and fishing rod assembly being pulled to cast out the fishing line from the device.

Although a specific number of ridges 32 are shown in FIGS. 2 through 4, this is not meant to limit the invention and the number of ridges and the size of the ridges may vary depending upon the amount of force desired for detachment of the cap and the degree of adherence of the spike 14 to the ground. It is the intention of this invention that the number of ridges 32 engaged by the grooves 34 of the cap 12 directly correlate to the amount of force required to remove the cap from the cylinder 10. The force required to demount the cap 12 and thereby for casting is varied by the changing number of ridges 32 engaged.

The remote force required to remove the cap 12 from the cylinder 10 must be less than the force required to uproot the spike 14 from the ground. This force for uprooting the spike 14 will vary with the type of soil and the moisture content of said soil surrounding the spike 14. The engagement by the cap 12 of only one ridge 32 on the cylinder 10 should enable the device to be utilized in the weakest soil situations.

The device 8 and its method of operation are shown in FIGS. 3 and 4. There is shown a fisherman 50 holding a rod 52 with a reel 54 attached. Connected to the reel 54 is a fishing line 56 which extends along the length of the rod 52 into the fully assembled casting device 60. The remote force described previously is applied to the cap 10 via the line 56. The fisherman 50 is shown about to launch the fishing line 56 from the casting device 60 into the surf 62. The casting device 60 is attached to the earth 64 by means of the conical spike 14 and the auger blade 38. The cylinder 10 is shown with the cap 12 attached thereto. The cap 12 is also detachably mounted to the cylinder 12 by means of the attachment means 20. The casting device 8 has been screwed into the earth 64 and is operated by the fisherman by applying force to the rod 52 and stretching the line 56 taut and by applying sufficient pressure to the rod 52 to flex it into an arc shape. A sufficient remote force is thereby applied by the fisherman 50 via the rod 52 and line 56 to a weight 66 held down by the cap 12 to eventually cause the cap 12 to flip off the cylinder 10 thus freeing the line 56 from the cylinder 10 and causing it to be launched with great force at great distance into the surf 62.

The interior of the device 8, with slot 40 therein, is shown in FIG. 4. A weight 66 is attached to the line 56 which is pulled adjacent the cap 12 and against the cylinder 10. Also attached to the line 56 is a hook 58. The hook 58 is housed within the cylinder 10 while pressure is applied to the line 56. The cap 12 is held in place on the cylinder 10 by means of the grooves 34 in the cap which are mated and interferred with by the ridges 32 formed about the cylinder 10. As previously indicated, when sufficient force is applied to a line 56 the fitting or interference between each ridge 32 and the respective groove 34 is overcome, thus freeing the cap 12 from the cylinder 10 and causing the weight 66 attached to the line 56 and the hook 58 also attached to the line 56 to be freed and launched into the air and eventually to a desired location (not shown).

The direction of force to be applied to the line 56 shown in FIGS. 3 and 4 is indicated by a vector next to the line 56.

It is to be understood that the invention is not limited to the precise construction shown for, for example, a means for demountably attaching said cover means to said enclosure instead of the ridges 32 and grooves 34, may comprise the cylinder 10 and cap 12 oppositely magnetized with the ridges 32 removed or the use of a magnet in some other fashion to hold the cap 12 on the cylinder 10. Thus, such changes are contemplated as readily fall within the spirit of the invention as shall be determined by the scope of the subjoined claims, to wit:

What is claimed is:

1. A casting device comprising an enclosure having an aperture and a coverable opening, attachment means connected to said enclosure for attaching said enclosure to earth, cover means for covering said opening connected to said enclosure, means for demountably attaching said cover means to said enclosure whereby said cover means is demounted by the application of a remote force conveyed through said aperture during casting and applied to said cover means from within said enclosure.

2. A method for casting with variable force a fishing line, hook and weight assembly attached to a fishing rod comprising placing said assembly in a casting device comprising an enclosure having an aperture and an opening, attachment means connected to said enclosure for attaching said enclosure to earth, cover means for covering said opening connected to said enclosure, means for demountably attaching said cover means to said enclosure to adjustably release under an applied force, last said means being connected to said cover means, last said means also being connected to said enclosure, the method comprising the steps of attaching said cover means to the opening of said enclosure to release under a predetermined force, threading said fishing line with the hook and weight attached through the aperture to the fishing rod, applying force to said fishing line by flexing said rod sufficiently to overcome the predetermined force attaching said cover means to said enclosure and whereby said cover means is demounted and said rod is deflexed and said line, weight and hook assembly is cast.

3. A casting device according to claim 1 wherein said means for demountably attaching said cover means to said enclosure comprises a plurality of mutally parallel ridges and a like plurality of adjacent grooves, each said ridge being disposed around said opening and each mutually parallel ridge and adjacent groove adapted to mate with each other, the means for demountably attaching said cover means being partly disposed on said cover means whereby the engagement of one ridge and one groove demountably attaches said cover means to said enclosure.

4. A casting device according to claim 1 wherein said means for demountably attaching said cover means to said enclosure comprises a disengageable ridge and a groove disposed around said opening, said groove being located inside said cover means and said ridge being located about the outside of said enclosure.

5. A casting device according to claim 1 wherein said means for demountably attaching said cover means to said enclosure comprises at least one ridge and at least one groove mutually engaged and disposed in between said cover means and said enclosure.

6. A casting device according to claim 5 wherein said enclosure is a hollow cylinder, said cover means is a cap and said aperture is a rectangular slot disposed at the opening of the cylinder covered by said cap.

7. A casting device according to claim 6 wherein said attachment means is a conical spike adapted for boring into the earth.

8. A casting device according to claim 7 wherein said spike further comprises an auger blade spirally disposed about a cone.

9. A casting device according to claim 8 wherein said cap, said cylinder and said spike are made of moldable material.

10. A casting device according to claim 9 wherein said blade is metal.

* * * * *